(12) United States Patent
Woldemar et al.

(10) Patent No.: US 10,490,232 B1
(45) Date of Patent: Nov. 26, 2019

(54) HELIUM-FILLED STORAGE CONTAINER

(71) Applicant: Seagate Technology LLC, Cupertino, CA (US)

(72) Inventors: Christopher M Woldemar, Singapore (SG); YiChao Ma, Singapore (SG); Xiong Liu, Singapore (SG); Li Hong Zhang, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/970,758

(22) Filed: May 3, 2018

(51) Int. Cl.
*H05K 7/20* (2006.01)
*G11B 33/14* (2006.01)
*G11B 33/02* (2006.01)
*G11B 33/12* (2006.01)

(52) U.S. Cl.
CPC ............ *G11B 33/148* (2013.01); *G11B 33/02* (2013.01); *G11B 33/126* (2013.01)

(58) Field of Classification Search
CPC ......... G06F 1/181; G06F 1/187; G11B 33/08; G11B 33/126; G11B 33/128; G11B 33/148
USPC .................................................. 361/704, 709
See application file for complete search history.

(56) References Cited

U.S. PATENT DOCUMENTS

| | | | |
|---|---|---|---|
| 7,042,736 B2 * | 5/2006 | Katakura | G11B 33/126 361/797 |
| 7,304,855 B1 | 12/2007 | Milligan et al. | |
| 7,983,032 B2 | 7/2011 | Walker et al. | |
| 9,829,937 B2 | 11/2017 | Hirano et al. | |
| 2003/0179489 A1 * | 9/2003 | Bernett | G11B 33/1466 360/97.22 |
| 2004/0159573 A1 * | 8/2004 | Lim | H01L 21/67017 206/524.4 |
| 2005/0110047 A1 * | 5/2005 | Katakura | G11B 33/126 257/200 |
| 2007/0053154 A1 * | 3/2007 | Fukuda | G11B 33/022 361/679.33 |
| 2010/0259913 A1 * | 10/2010 | Coburn | H01L 23/552 361/809 |
| 2015/0008218 A1 * | 1/2015 | Lupul | B65D 88/005 220/8 |
| 2015/0355685 A1 * | 12/2015 | Hirano | G06F 1/181 361/679.33 |
| 2015/0359115 A1 * | 12/2015 | Hirano | G06F 1/181 361/679.34 |
| 2016/0198565 A1 * | 7/2016 | Smith | G06F 1/20 361/679.34 |

* cited by examiner

*Primary Examiner* — Yuriy Semenenko
(74) *Attorney, Agent, or Firm* — Faegre Baker Daniels LLP

(57) ABSTRACT

A storage container includes a base housing member coupled to an inner cover and including an inner cavity. The storage container further includes an outer cover coupled to the base housing member and covering the inner cover. A rack assembly includes a plurality of storage devices and is mounted within the inner cavity.

20 Claims, 7 Drawing Sheets

HELIUM-FILLED STORAGE CONTAINER

TECHNICAL FIELD

Certain embodiments of the present disclosure relate to assemblies and methods involving helium-filled storage containers—including various approaches for sealing the storage containers, thermal management for the storage containers, and electrically connecting components within and outside of the storage containers.

BACKGROUND

A hard disk drive typically includes a housing that forms an internal environment. Sealing and filling the internal environment with gases other than air can enhance performance of the hard disk drive. For example, low-density inert gases such as helium can reduce the aerodynamic drag between magnetic recording media and associated read/write heads compared to operating in air. This reduced aerodynamic drag results in reduced power usage for the spindle motor. A helium-filled hard disk drive thus uses less power than a comparable hard disk drive that operates in an air environment.

SUMMARY

In certain embodiments, a storage container includes a base housing member coupled to an inner cover and including an inner cavity. The storage container further includes an outer cover coupled to the base housing member and covering the inner cover. A rack assembly includes a plurality of storage devices and is mounted within the inner cavity.

In certain embodiments, a storage container includes a housing including a wall with a plurality of openings, a plurality of hard disk drives positioned within the housing, and a plurality of electrical connectors. Each electrical connector covers a respective opening of the plurality of openings, and each of the plurality of hard disk drives is electrically coupled to the plurality of electrical connectors.

In certain embodiments, a storage container includes a base housing member coupled to an inner cover and including an inner cavity that is at least partially filled with helium. The inner cover includes an opening for filling and refilling the inner cavity with helium. An outer cover is coupled to the base housing member and covers the inner cover. A sealing member is positioned between the inner cover and the outer cover adjacent the opening and is configured to mitigate helium leakage through the opening. A rack assembly includes a plurality of storage devices and is mounted within the inner cavity.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
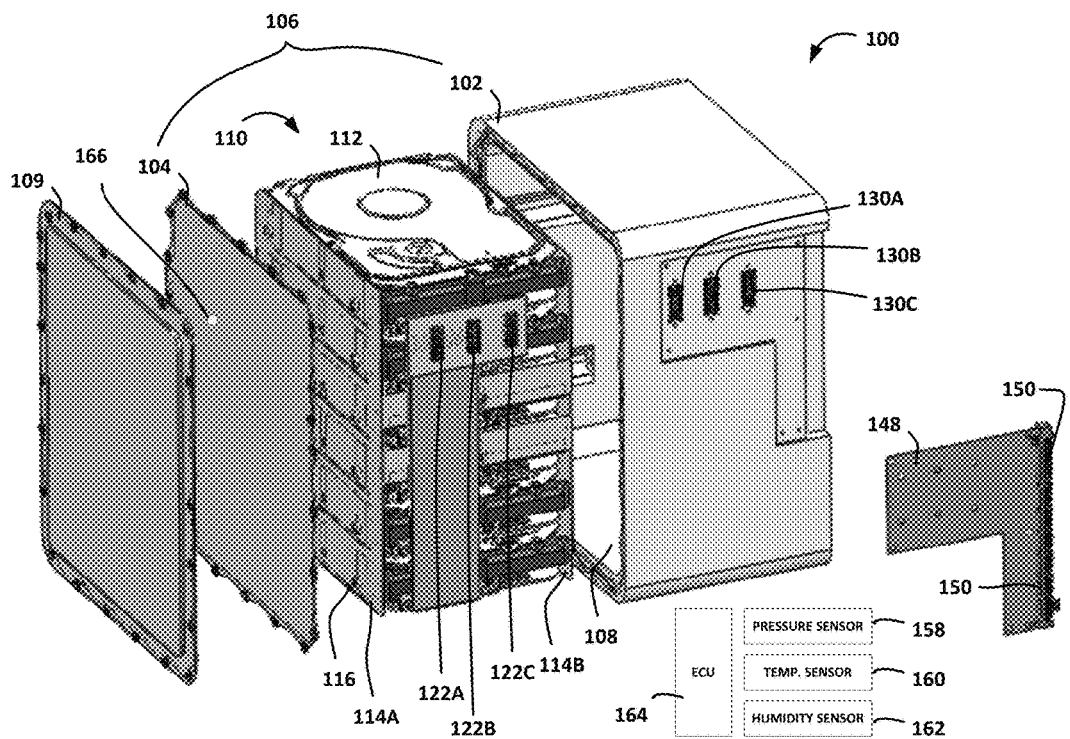
FIG. 1 shows an exploded view of a storage container, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

As mentioned above, helium-filled hard disk drives have certain advantages over air-filled hard disk drives. These advantages include lower power consumption and reduced friction, vibration, etc., compared to air-filled hard disk drives. Reduced friction allows helium-filled hard disk drives to include more magnetic storage disks compared to similarly-sized air-filled hard disk drives and therefore have a higher storage capacity. But, helium-filled hard disk drives are typically more expensive than air-filled hard disk drives because helium-filled hard disk drives include additional and often more expensive materials and components (e.g., pressure sensors). Further, helium-filled hard disk drives require additional processing during manufacture to hermetically seal the helium gas within the hard disk drives. Because helium is a low-density gas, it is challenging to hermetically seal and maintain such a seal. Air-filled hard disk drives can be considered to be unsealed because such hard disk drives usually include a breather hole that permits limited exchange of gases and/or moisture between an internal hard disk drive atmosphere and an outer atmosphere.

Certain embodiments of the present disclosure describe a storage container that can be filled with a low-density gas, like helium, and hermetically sealed. The storage container can house multiple hard disk drives, including hard disk drives that are not hermetically sealed and thus do not require the additional components and materials of hermetically sealed hard disk drives, while realizing the benefits of a helium-filled environment for those hard disk drives.

Further, in certain embodiments, certain components (e.g., pressure sensors, humidity sensors, temperature sensors, environmental control units with desiccants) typically used in each hard disk drive (helium-filled or not) can be removed from the hard disk drives—thus saving costs—because the storage container itself can utilize such components in a manner that enables those components to operate with multiple hard disk drives positioned within the storage container. Still further, certain embodiments of the present disclosure relate to assemblies and methods involving helium-filled storage containers—including various approaches for sealing the storage containers, thermal management for the storage containers, and electrically connecting components within and outside of the storage containers.

FIG. 1 shows an exploded view of a storage container 100, which can be used as a stand-alone storage unit (e.g., a network attached storage (NAS) device and/or a redundant array of inexpensive disks (RAID)) or incorporated into a larger storage system (e.g., server). For example, a server could include one or more storage containers 100 installed in each drawer in a server rack. The storage container 100 can be hermetically sealed and filled with gases such as low-density gases like helium.

The storage container 100 includes a base housing member 102 and an inner cover 104 that, when assembled, form a housing 106 with an internal cavity 108. The storage container also includes an outer cover 109. The storage container 100 includes a rack assembly 110, which includes storage devices 112 (e.g., hard disk drives) and which is to be mounted and positioned within the housing 106. The storage devices 112 can be traditional air-filled hard disk drives that, when positioned within the helium-filled storage container 100, can become filled with helium due to their non-sealed configurations. For example, the storage devices 112 may include one or more breather holes that permit gases to flow into and out of an internal cavity of the storage device 112. As such, the storage devices 112 can realize the benefits of helium-filled storage devices without the added costs (e.g., more expensive materials and components and additional processing during manufacture) associated with helium-filled storage devices. During manufacture and assembly of the storage container 100, the rack assembly 110 can be assembled together with the storage devices 112 before the rack assembly 110 is mounted within the housing 106.

Figure 2:
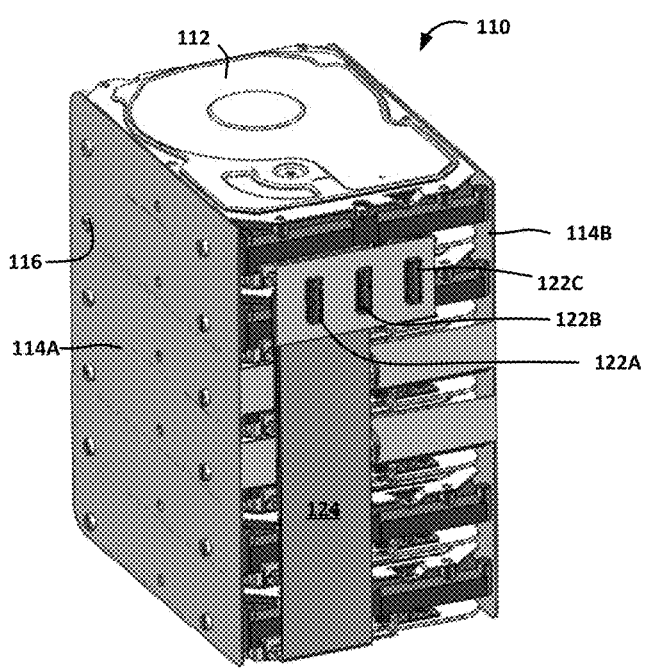
FIG. 2 shows a rack assembly to be used as part of the storage container of FIG. 1, in accordance with certain embodiments of the present disclosure.

As shown in FIGS. 1 and 2, the rack assembly 110 is shown as including six storage devices 112. The storage container 100 can be larger or smaller than the storage container 100 shown in the figures and therefore can accommodate fewer (e.g., three) or more (e.g., twelve) storage devices 112. As such, the storage container 100 may include a rack assembly 110 that mounts fewer storage devices 112 or that mounts more storage devices 112. In certain embodiments, the storage container 100 includes multiple rack assemblies. For example, storage containers with twelve storage devices may include two rack assemblies that can each mount six storage devices.

Figure 3:
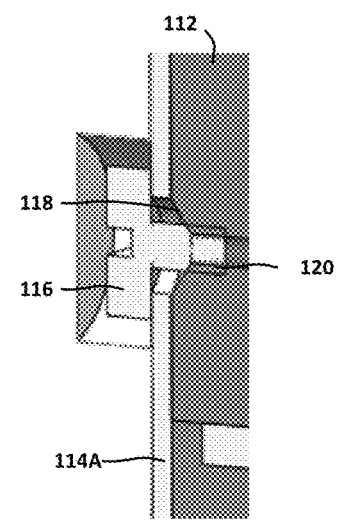
FIG. 3 shows a partial, cut-away view of the rack assembly of FIG. 2, detailing coupling between a sidewall and a storage device, in accordance with certain embodiments of the present disclosure.

The rack assembly 110 is shown as including a first sidewall 114A and a second sidewall 114B with the storage devices 112 positioned therebetween. The storage devices 112 are coupled to the sidewalls 114A and 114B by fasteners 116 that extend through openings 118 (see FIG. 3) in the sidewalls 114A and 114B and that attach to the storage devices 112. As shown in FIG. 3, the storage devices 112 may include fastener receivers 120 (e.g., internal thread) in which the fasteners 116 extend and directly couple to the storage devices 112. Various components of the rack assembly 110 can be comprised of stainless steel (e.g., stainless steel sheet metal).

Figure 4:
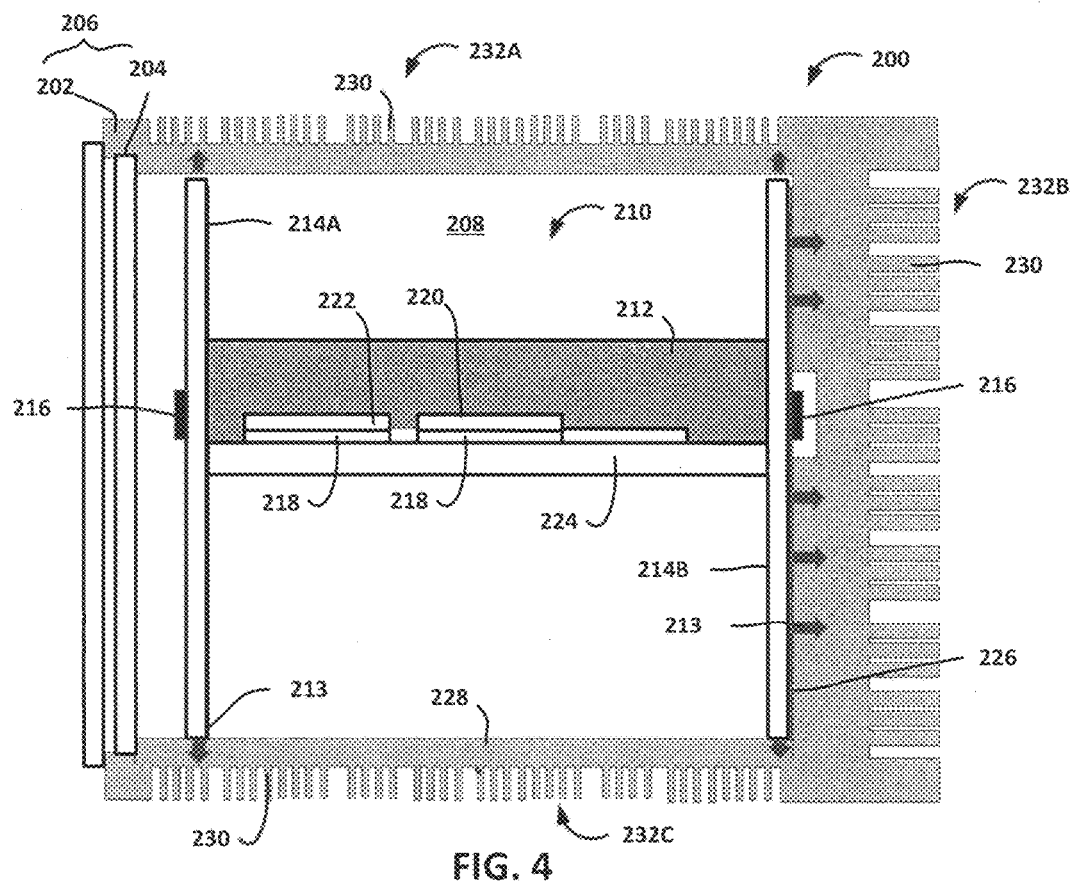
FIG. 4 shows a partial, cut-away view of a storage container, in accordance with certain embodiments of the present disclosure.
Figure 5:
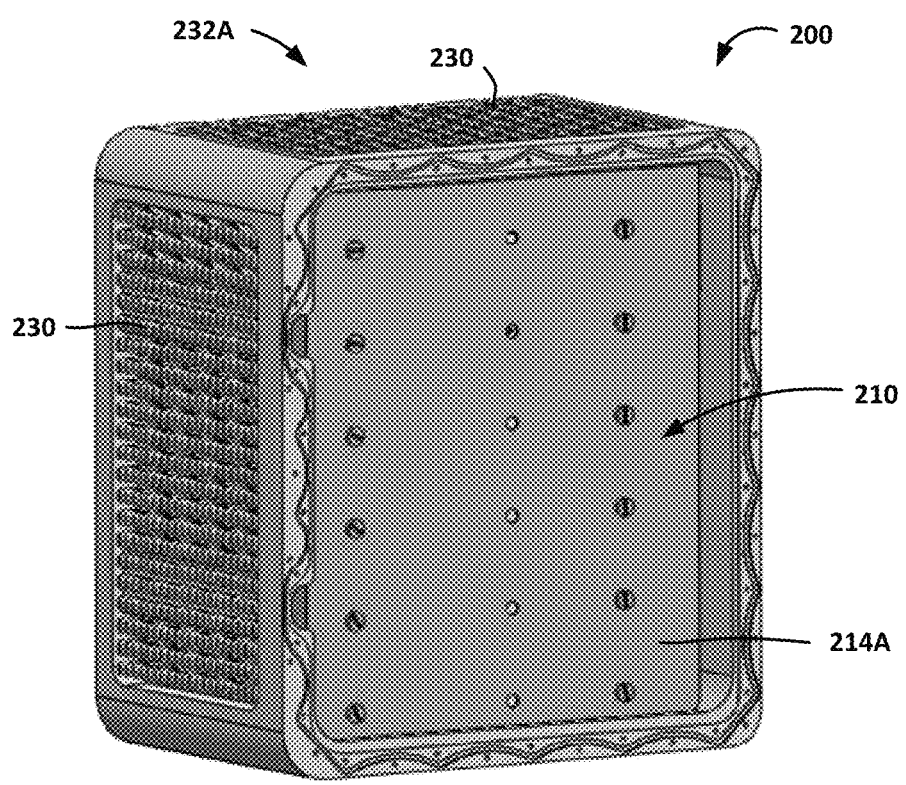
FIG. 5 shows a perspective view of the storage container of FIG. 4, in accordance with certain embodiments of the present disclosure.

The rack assembly 110 can include various features to assist with managing heat generated by the storage devices 112. FIG. 4 shows an exemplary storage container 200 with such features. The features shown in FIG. 4 can be incorporated into the storage container 100 and the rack assembly 110 of FIGS. 1-3. The storage container 200 includes a base housing member 202, an inner cover 204, a housing 206, an internal cavity 208 formed by the base housing member 202 and the inner cover 204, and an outer cover 209. FIG. 5 shows a perspective view of the storage container 200 without the inner cover 204 or outer cover 209. The storage container 200 also includes a rack assembly 210, which includes a storage device 212. For simplicity, only one storage device 212 is shown in FIG. 4 to show how heat generated by the storage device 212 is transferred from the storage device to the air outside the storage container 200. The various arrows 213 along the rack assembly 210 indicate directions of heat transfer among the components of the rack assembly 210. The rack assembly 210 includes a first sidewall 214A and a second sidewall 214B with the storage device 212 positioned therebetween. The storage device 212 is coupled to the sidewalls 214A and 214B by fasteners 216.

In operation, storage devices (e.g., the storage device 212) in the storage container 200 generate heat, which can affect performance of the storage devices and/or cause unwanted thermal expansion of components within the storage container 200. In certain embodiments, each storage device 212 is coupled to a thermal interface material (TIM) 218 to help enhance thermal coupling between the storage device 212 and a surrounding components of the rack assembly 210. For example, one or more individual pieces of TIM 218 can be directly coupled to the storage device 212. In some examples, one piece of TIM 218 is directly coupled to a motor 220, which is centrally positioned on a storage device 212, and another piece of TIM 218 is directly coupled to a printed circuit board 222 of the storage device 212. The TIM 218 can comprise thermally conductive materials (e.g., metals, polymers, greases, adhesives, and the like and combinations thereof) that are coupled to the storage device 212.

Heat generated by the storage device 212 can transfer to the one or more pieces of TIM 218 and then to a plate 224. The plate 224 can help support respective storage devices within the rack assembly 210. The plate 224 can comprise thermally conductive materials such as aluminum. The heat transferred to the plate 224—whether via the TIM 218 or otherwise via contact with or proximity to the storage device 212—can then transfer to one of the sidewalls 214A and 214B of the rack assembly 210. As mentioned above, the sidewalls 214A and 214B can be comprised of comprise thermally conductive materials such as stainless steel. The heat transferred to the one or more sidewalls 214A and 214B can then be transferred to the base housing member 202 of the storage container 200. In certain embodiments, as shown in FIG. 4, one of the faces 226 (or a portion thereof) of the sidewalls 214A and 214B of the rack assembly 210 directly contacts the base housing member 202—thus providing a relatively large amount of surface area contact for heat transfer from the sidewall 214A and 214B to the base housing member 202. In certain embodiments, a TIM is positioned between the face 226 and the base housing member 202. In certain embodiments, as shown in FIG. 4, the sidewalls 214A and 214B at least partially rest on a floor 228 of the base housing member 202. FIG. 4 also shows the base housing member 202 including heat sinks 230 (e.g., fins, ribs). As shown in FIGS. 4 and 5, multiple surfaces of the base housing member 202 can have sets 232A-C of heat sinks 230.

As such, heat originally generated by the storage device 212 can be transferred outside the storage container 200 via a path from the storage device 212 to the plate 224 (via the TIM 218 or through contact or proximity with the storage device 212), to the sidewalls 214A and 214B, and to the base housing member 202 and its heat sinks 230. In certain embodiments, heat can also transfer from the storage device 212 to the base housing member 202 via the inner cover 204 and/or the outer cover 209.

The storage container 100 and 200 can include various features to electrically and communicatively couple the storage devices 112 and 212 to host device (e.g., server, desktop computer, laptop computer, and the like). FIGS. 1, 2, and 6-8 show the storage container 100 with such features. These features can be incorporated into the storage container 200 and the rack assembly 210 of FIGS. 4 and 5.

Figure 6:
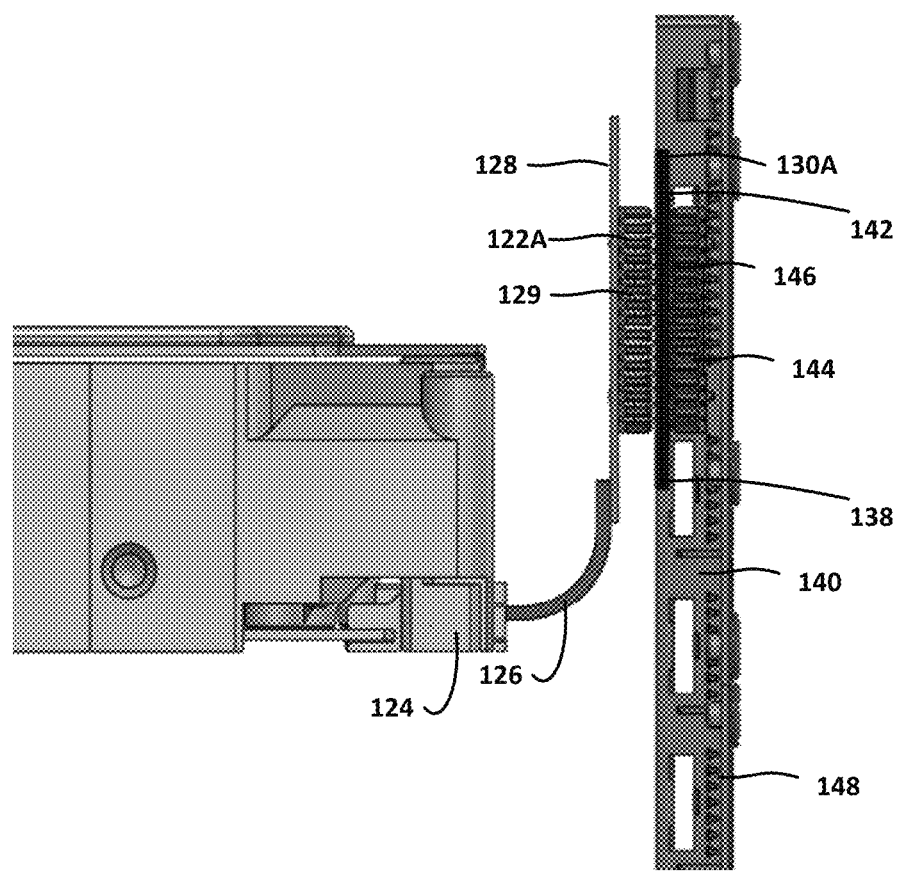
FIG. 6 shows a partial, cut-away view of the storage container of FIG. 1, in accordance with certain embodiments of the present disclosure.

Referring back to FIGS. 1 and 2, the storage devices 112 are electrically and communicatively coupled to one of a first set of electrical connectors 122A-C (i.e., a first electrical connector 122A, a second electrical connector 122B, and a third electrical connector 122C) coupled to the rack assembly 110. Accordingly, these electrical connectors 122A-C are positioned within the internal cavity 108. Each of the storage devices 112 includes an electrical interface 124 (e.g., serial AT attachment (SATA) interface shown in more detail in FIG. 8) that is electrically and communicatively coupled to one or more electrical wires 126 (shown in FIG. 6) and/or a flexible circuit, either of which is electrically and communicatively coupled to a printed circuit board 128 (shown in FIG. 6) and/or the first set electrical connectors 122A-C. For simplicity, FIG. 6 shows only one of the storage devices 112 of the storage container 100 being electrically and communicatively coupled to the first electrical connector 122A via the electrical wires and/or flexible circuit 126 and the printed circuit board 128. The other storage devices 112 in the storage container 100 can be similarly electrically and communicatively coupled to at least one of the first set electrical connectors 122A-C.

As shown in FIG. 6, the electrical connectors 122A-C can include a number of conductors 129 (e.g., pins) that mechanically, electrically, or otherwise communicatively couple with other electrical connectors. For example, the first set of electrical connectors 122A-C can be mechanically, electrically, and communicatively coupled to a second set of respective electrical connectors 130A-C (i.e., a fourth electrical connector 130A, a fifth electrical connector 130B, and a sixth electrical connector 130C), which are shown in FIG. 1 as being at least partially positioned within the base housing member 102 and which are shown in more detail in FIG. 7.

Figure 7:
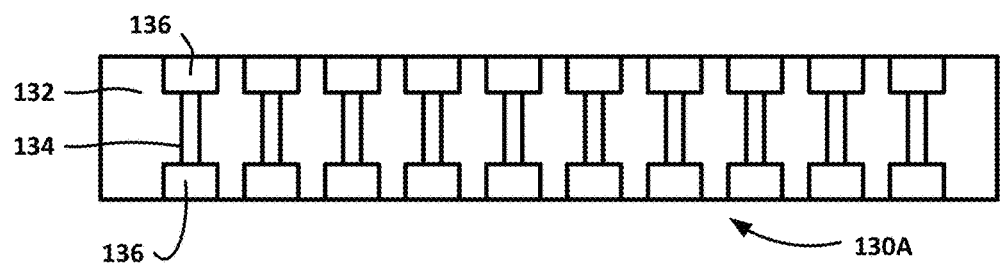
FIG. 7 shows a schematic, cut-away view of an electrical connector, in accordance with certain embodiments of the present disclosure.

The second set of electrical connectors 130A-C can be low-temperature co-fired ceramic (LTCC) connectors or other types of electrical connectors that mitigate leakage of low-density gases like helium through the connectors. As shown in FIG. 7, the second set of electrical connectors 130A-C can include a layer 132 or set of layers comprising a ceramic material and conductive paths 134 between conductive pads 136 positioned on opposing surfaces of the layer 132. The second set of electrical connectors 130A-C are mounted to the base housing member 102 such that one set of the conductive pads 136 face the internal cavity 108 and another set of the conductive pads 136 face outside the storage container 100. Accordingly, when the conductors 129 of the first set of electrical connectors 122A-C are coupled to the conductive pads 136, electrical signals from the first set of electrical connectors 122A-C may be passed between the internal cavity 108 and an exterior of the storage container 100 while a hermetic seal of the housing 106 is maintained. For example, the second set of electrical connectors 130A-C can pass electrical signals between a set of electrical connectors with pin-based conductors positioned within the storage container 100 and a another set of electrical connectors with pin-based conductors positioned outside the storage container 100.

As mentioned above and shown in FIG. 6, the second set of electrical connectors 130A-C is at least partially positioned within the base housing member 102. The base housing member 102 has openings 138 within a wall 140 of the base housing member 102. Respective electrical connectors 130A-C are positioned within the openings 138. A seal 142 (e.g., gasket or adhesive) can be positioned between the respective electrical connectors 130A-C and the openings 138 and comprise materials that create a seal that mitigates leakage of helium at or around the second set of electrical connectors 130A-C. For example, each of the second set of electrical connectors 130A-C could be adhered to the base housing member 102 using an adhesive that is impermeable to helium leakage.

The storage container 100 may also include a third set of electrical connectors 144 (only one of which is shown in FIG. 6) that are mechanically, electrically, and communicatively coupled to the second set of electrical connectors 130A-C. Like the first set of electrical connectors 122A-C, the third set of electrical connectors 144 can include conductors 146 that couple to respective conductive pads 136 of the second set of electrical connectors 130A-C. The third set of electrical connectors 144 can be coupled to a printed circuit board 148, which includes one or more electrical interfaces 150 (e.g., universal serial bus) for communication with a host device and shown in FIG. 1. In certain embodiments, the printed circuit board 148 includes an electrical interface 150 for each storage device 112 in the storage container 100. In certain embodiments, the storage container 100 does not include the printed circuit board 148 and the electrical interface 150 and instead is electrically and communicatively coupled to a host device without the printed circuit board 148 and electrical interface 150. Using the various components described herein, the storage devices 112 are electrically and communicatively coupled to one or more electrical interfaces 150 and ultimately to a host device.

Figure 8:
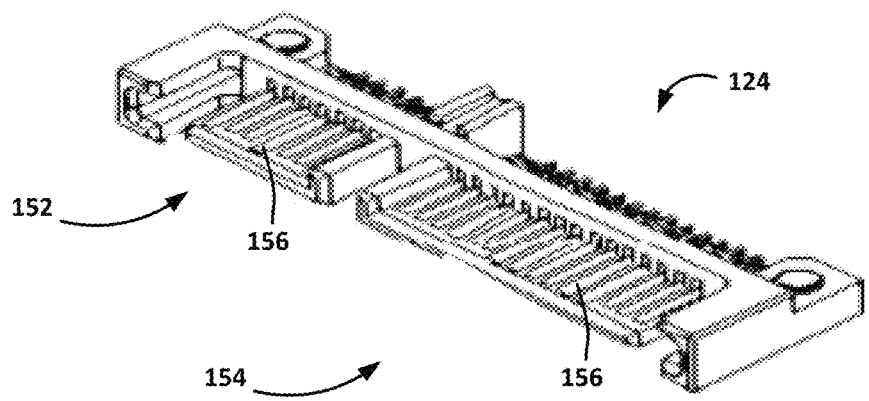
FIG. 8 shows a schematic, perspective view of an electrical interface, in accordance with certain embodiments of the present disclosure.

FIG. 8 shows an example electrical interface 124 of the storage device 112. In particular, FIG. 8 shows a SATA interface 124 with a data section 152 and a power section 154. The data section 152 of the SATA interface 124 includes various conductors 156 (e.g., pins) associated with data signals to and from the storage device 112, and the power section 154 of the SATA interface 124 includes various conductors 156 associated with power signals and ground to and from the storage device 112. For example, the SATA interface 124 may include seven conductors 156 in the data section 152 and fifteen conductors 156 in the power section 154. In such embodiments, among the six storage devices, there would be a total of forty-two data conductors 156 and ninety power conductors 156 for a total of one hundred thirty-two conductors 156. Certain conductors 156 in the power section 154 may be dedicated to facilitating certain voltages. In certain embodiments, three of the conductors 156 in the power section 154 are used for 3.3 volts, three other conductors 156 for five volts, and another three conductors 156 for twelve volts.

To reduce the number and/or size of openings in the base housing member 102 (and therefore the number and/or extent of potential paths for helium leakage), the storage container 100 can include fewer electrical connectors positioned within the wall 140 of the base housing member 102 than there are storage devices 112. For example, although the storage container 100 includes six storage devices 112, the storage container 100 is shown as only having three electrical connectors 130A-C in the wall 140 of the base housing member 102. In certain embodiments, this reduced number of electrical connectors is accomplished by sharing conductors (e.g., a set of a single conductive path 134 and two conductive pads 136) among multiple storage devices 112. For example, some of the conductors of the various electrical connectors can be electrically and communicatively coupled to multiple storage devices 112. These shared conductors can be those dedicated to coupling power and/or ground to the storage devices 112. In certain embodiments with six storage devices 112, there may be a minimum number of six conductors dedicated to power, eight conductors dedicated to ground, and forty-two conductors dedicated to data signals for a total of eighty-four conductors. Conductors dedicated to data signals generally cannot be shared among different storage devices 112. As such, the first set, the second set, and the third set of electrical connectors 122A-C, 130A-C, and 144 may include eighty-four conductors dedicated to electrically and communicatively coupling to the storage devices. The sets of electrical connectors may include additional conductors for storage devices and/or for electrically and communicatively coupling to other electrical components (e.g., pressure sensor(s), temperature sensor(s), humidity sensor(s)) in the storage container 100.

As just mentioned, the storage container 100 can include one or more pressure sensors 158, temperature sensors 160, and humidity sensors 162 positioned within the internal cavity 108 and configured to measure, respectively, the pressure, temperature, and humidity within the storage container 100. In certain embodiments, the sensors are mounted to the circuit board 128 (shown in FIG. 6) or another circuit board positioned within the internal cavity 108. Output signals from the one or more pressure sensors 158, temperature sensors 160, and humidity sensors 162 can be used to ensure that the storage container 100 is operating within a desired range of conditions. For example, the storage container 100 may include circuitry (e.g., a controller) that receives the output signals from the various sensors and compares the output signals to predetermine thresholds of pressure, temperature, and humidity. If any one of the thresholds is breached, the circuitry can generate an alert signal that the storage container 100 is outside a desired operating condition. In another example, if the output signals of the pressure sensor 158 indicate a high or low pressure relative to one atmosphere, the circuitry could generate a signal that alerts the user to refill the storage container 100 with helium. The output signals from the various sensors can also be used by the storage devices 112 to change certain operating conditions. For example, hard disk drives may be programmed to change operating conditions (e.g., read/write head fly height) based on the pressure, temperature, and/or humidity within the hard disk drive. Here, instead of each storage device 112 having its own dedicated pressure, temperature, and/or humidity sensor, the storage container 100 can include a single pressure sensor 158, a single temperature sensor 160, and a single humidity sensor 162 that are shared among the storage devices 112, thus reducing overall cost of the storage container 100. The storage container 100 can also include an environmental control unit (ECU) 164 with desiccants that absorb organic vapor contamination and/or moisture that may affect operation of the storage devices 112.

Figure 9:
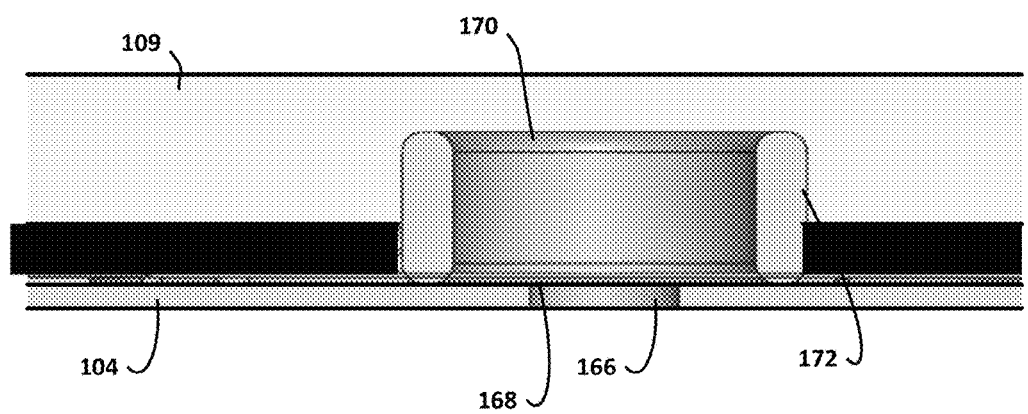
FIG. 9 shows a partial, cut-away view of the storage container of FIG. 1, in accordance with certain embodiments of the present disclosure.

FIGS. 1 and 9 show the storage container 100 with various features to assist with initially filling and then refilling the storage container 100 with helium (and/or other inert gases) to maintain the desired environment within the internal cavity 108. The features shown in FIGS. 1 and 9 can be incorporated into the storage container 100 the storage container 200 of FIGS. 4 and 5. FIG. 9 shows a cut-away view of the inner cover 104 and the outer cover 109. The inner cover 104 can be coupled to base housing member 102 via fasteners that extend through openings in the inner cover 104 to engage with features of the base housing member 102. In certain embodiments, a gasket or adhesive is positioned between the inner cover 104 and the base housing member 102 to assist with mitigating gas leakage from the internal cavity 108.

The inner cover 104 includes an opening 166 through which a target gas (e.g., gas comprising helium, oxygen, nitrogen) can be injected through to initial fill and refill the storage container 100. Once the target gas reaches a desired pressure within the storage container 100, a seal 168 can be applied to the inner cover 104 to cover the opening 166. The seal 168 can comprise materials that mitigate helium leakage, and the seal 168 can be attached to the inner cover 104 by an adhesive. Should the storage container 100 need to be refilled with helium, the seal 168 can be pierced and/or removed from the inner cover 104, and another seal can be used to cover the opening 166. The seal 168 assists with mitigating helium leakage while the storage container 100 continues to be assembled and tested during manufacture.

The outer cover 109 can be coupled to the base housing member 102 via fasteners that extend through openings in the inner cover 104 to engage with features of the base housing member 102. In certain embodiments, a gasket or adhesive is positioned between the outer cover 109 and the base housing member 102 to assist with mitigating gas leakage from the internal cavity 108.

The outer cover 109 can be coupled to a sealing member 170. For example, the outer cover 109 may include a recess 172 in which the sealing member 170 is positioned. The sealing member 170 can be adhered or otherwise coupled to the outer cover 109. The sealing member 170 is positioned on the outer cover 109 such that, when the outer cover 109 is assembled to the base housing member 102, the sealing member 170 is positioned adjacent the opening 166. In certain embodiment, the sealing member 170 is directly coupled between the inner cover 104 and the outer cover 109. For example, sealing member 170 may not contact the seal 168 and instead may contact the inner cover 104 directly. As such, the sealing member 170 provides additional assistance with mitigating helium leakage from the internal cavity 108. The sealing member 170 can comprise one or more layers of materials that have low helium permeation such as materials with nitrile, fluorocarbons, ethylene propylene diene monomer, polyvinyl chloride and perfluoroelastomer. In certain embodiments, the sealing member 170 comprises a form-in-place gasket (FIPG). Storage devices like hard disk drives may use an FIPG to provide a limited seal between a base deck and top cover. These hard disk drive FIPGs generally comprise silicon because of its ability to provide a seal given the space constraints and outgassing requirements of a hard disk drive. But, silicon-based FIPGs have been found to have relatively poor helium permeation. Because the storage container 100 has fewer space constraints than hard disk drive and/or because the internal cavity 108 of the storage devices 112 is not necessarily exposed to the FIPGs, the low-helium-permeation materials listed above can be used and can provide ten to thirty times better helium permeation compared to silicon-based FIPGs.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A storage container comprising:
   a base housing member coupled to an inner cover to create an inner cavity, which is at least partially filled with helium;
   an outer cover coupled to the base housing member and covering the inner cover; and
   a rack assembly including a plurality of storage devices and mounted within the inner cavity.

2. The storage container of claim 1, wherein the rack assembly includes a first sidewall and a second sidewall, wherein the storage devices are mounted between the first sidewall and the second sidewall.

3. The storage container of claim 2, wherein the rack assembly includes a plurality of plates mounted between the first sidewall and the second sidewall.

4. The storage container of claim 2, wherein a face of one of the first and the second sidewalls is directly coupled to the base housing member.

5. The storage container of claim 1, wherein the base housing member includes a plurality of sets of heat sinks.

6. The storage container of claim 5, further comprising:
   means for transferring heat generated by the plurality of storage devices from the plurality of storage devices to the plurality of sets of heat sinks.

7. The storage container of claim 1, wherein the inner cover includes an opening, the storage container further comprising:
   a sealing member positioned between the inner cover and the outer cover adjacent the opening.

8. The storage container of claim 7, wherein the sealing member comprises nitrile, fluorocarbons, an ethylene propylene diene monomer, a polyvinyl chloride, or a perfluoroelastomer.

9. The storage container of claim 1, wherein the base housing member includes a wall with a plurality of openings, the storage container further comprising:
   a plurality of electrical connectors, each electrical connector covering a respective opening of the plurality of openings, the plurality of storage devices being electrically coupled to the plurality of electrical connectors.

10. The storage container of claim 9, wherein the plurality of electrical connectors are low-temperature co-fired ceramic connectors.

11. The storage container of claim 9, wherein each of the plurality of electrical connectors includes a plurality of conductive paths.

12. The storage container of claim 9, wherein some of the plurality of conductive paths are communicatively coupled to multiple of the plurality of storage devices.

13. The storage container of claim 9, wherein some of the plurality of conductive paths are communicatively coupled to only one of the plurality of storage devices.

14. The storage container of claim 9, wherein each of the electrical connectors is communicatively coupled to two of the plurality of storage devices.

15. The storage container of claim 9, wherein the number of electrical connectors positioned within the wall of the base housing member is less than the number of storage devices positioned within the inner cavity.

16. The storage container of claim 9, further comprising:
   means for electrically coupling the storage devices to a host device.

17. A storage container comprising:
   a base housing member coupled to an inner cover and including an inner cavity that is at least partially filled with helium, the inner cover including an opening for filling and refilling the inner cavity with helium;
   an outer cover coupled to the base housing member and covering the inner cover;
   a sealing member positioned between the inner cover and the outer cover adjacent the opening and configured to mitigate helium leakage through the opening; and
   a rack assembly including a plurality of storage devices and mounted within the inner cavity.

18. The storage container of claim 17, further comprising:
   a seal adhered to the inner cover and covering the opening.

19. The storage container of claim 17, wherein the sealing member comprises nitrile, fluorocarbons, an ethylene propylene diene monomer, a polyvinyl chloride, or a perfluoroelastomer.

20. The storage container of claim 1, wherein the outer cover and the inner cover are positioned with a space therebetween.

* * * * *